United States Patent
Kim et al.

(10) Patent No.: US 10,989,535 B1
(45) Date of Patent: Apr. 27, 2021

(54) CALIBRATION CIRCUIT TO MITIGATE FIBER-OPTIC GYROSCOPE (FOG) BIAS ERROR

(71) Applicants: Steven M. Kim, Santa Clara, CA (US); Gregory A. Zimmerman, Sandy, UT (US); Daniel A. Tazartes, West Hills, CA (US)

(72) Inventors: Steven M. Kim, Santa Clara, CA (US); Gregory A. Zimmerman, Sandy, UT (US); Daniel A. Tazartes, West Hills, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/778,589

(22) Filed: Jan. 31, 2020

(51) Int. Cl.
| | |
|---|---|
| *G01C 19/72* | (2006.01) |
| *G02B 6/42* | (2006.01) |
| *G02F 1/31* | (2006.01) |
| *G02B 6/44* | (2006.01) |
| *G02B 26/08* | (2006.01) |

(52) U.S. Cl.
CPC ......... *G01C 19/721* (2013.01); *G02B 6/4214* (2013.01); *G02B 6/4457* (2013.01); *G02B 26/08* (2013.01); *G02F 1/31* (2013.01); *G02F 2203/50* (2013.01)

(58) Field of Classification Search
CPC .... G02B 6/4457; G02B 26/08; G02B 6/4214; G02F 1/31; G02F 2203/50; G01C 19/721; G01C 19/722
See application file for complete search history.

(56) References Cited

U.S. PATENT DOCUMENTS

| | | | |
|---|---|---|---|
| 5,080,488 A | 1/1992 | Buehler et al. | |
| 5,157,461 A * | 10/1992 | Page | G01C 19/72 356/462 |
| 5,365,337 A * | 11/1994 | Page | G01C 19/721 250/227.27 |
| 5,469,257 A | 11/1995 | Blake et al. | |
| 5,719,674 A * | 2/1998 | Martin | G01C 19/728 356/462 |
| 8,422,021 B2 | 4/2013 | Wang et al. | |
| 10,823,571 B1 * | 11/2020 | Wu | G01C 19/70 |
| 2018/0356229 A1 * | 12/2018 | Porsandeh Khial | G01C 19/727 |
| 2019/0049249 A1 * | 2/2019 | Wu | G02B 6/12007 |

* cited by examiner

*Primary Examiner* — Michael P LaPage
(74) *Attorney, Agent, or Firm* — Tarolli, Sundheim, Covell & Tummino LLP

(57) ABSTRACT

One example includes a fiber-optic gyroscope (FOG) system that includes a fiber coil. The coil includes an optical fiber wound around a spool of a FOG. The optical fiber includes a first input and a second input. The system also includes an optical beam controller comprising an optical switch that provides a first optical beam to the first input and a second optical beam to the second input during a first switching state, and provides the first optical beam to the second input and the second optical beam to the first input during a second switching state. The system further includes a controller that mitigates bias error in determining rotation of the FOG based on comparing the first and second optical beams output from the FOG during the first and second switching states.

20 Claims, 4 Drawing Sheets

CALIBRATION CIRCUIT TO MITIGATE FIBER-OPTIC GYROSCOPE (FOG) BIAS ERROR

TECHNICAL FIELD

This disclosure relates to sensors, and more particularly to a calibration circuit to mitigate fiber-optic gyroscope bias error.

BACKGROUND

Fiber-optic gyroscope (FOG) coils are generally controlled by one or more control loops where light traveling in opposite directions is applied to the coil to determine parameters such as rotation rate and angular position changes. As an example, rotation of the coil about an axis can lead to a phase difference between the counter-rotating beams. Phase-modulation is usually applied to the light to improve the observability of the rotation signal. The step duration for the modulation signal applied to the FOG is approximately equal to an optical transit time. In some cases, random phase modulation (RPM) may be employed, but in other cases different types of modulation can be utilized. In the example of RPM, an automatic gain control (AGC) loop is employed to maintain unity gain around the primary (rate) servo loop for the FOG to maximize bandwidth. The bandwidth is generally driven by a multi-period delay in applying a new step in response to a gyroscope input. In the first period, the optical signal is integrated and converted by an analog-to-digital converter (ADC). The second period is consumed processing the received gyroscope output and computing what the feedback step size should be which is then added to the appropriate modulation value. Typically, this new step size cannot be applied at the end of the second period and needs to wait until the end of the third period to be applied. As the gyroscope sensing coil lengths is made longer however, it is possible to apply the signal at the end of the second period, but the delay may still affect bandwidth and vibration sensitivity.

SUMMARY

One example includes a fiber-optic gyroscope (FOG) system that includes a fiber coil. The coil includes an optical fiber wound around a spool of a FOG. The optical fiber includes a first input and a second input at respective ends of the coil. The system also includes an optical beam controller comprising an optical switch that provides a first optical beam to the first input and a second optical beam to the second input during a first switching state, and provides the first optical beam to the second input and the second optical beam to the first input during a second switching state. The system further includes a controller that mitigates bias error in determining rotation of the FOG based on comparing the first and second optical beams output from the FOG during the first and second switching states.

Another example includes a method for determining rotation about a sensitive axis for a FOG system. The method includes generating an optical beam via a beam source and splitting the optical beam into a first optical beam and a second optical beam. The method also includes setting an optical switch to a first switching state via a switching signal and providing the first optical beam to a first input associated with an optical fiber and the second optical beam to a second input associated with the optical fiber in the first switching state. The optical fiber can form an optical fiber coil wound around a spool of a FOG. The method also includes setting the optical switch to a second switching state via the switching signal and providing the first optical beam to the second input and the second optical beam to the first input in the second switching state. The method further includes measuring rotation of the FOG about the sensitive axis in each of the first and second switching states to substantially mitigate bias error associated with the measured rotation.

Another example includes an optical fiber coil that includes an optical fiber wound around a spool of a FOG. The optical fiber includes a first input and a second input. The system also includes an optical beam controller. The optical beam controller includes a multifunction integrated optical chip (MIOC) configured to split an optical beam into a first optical beam and a second optical beam and to provide phase control of the first and second optical beams, and a 2×2 optical switch configured to provide the first optical beam to the first input and the second optical beam to the second input during a first switching state and to provide the first optical beam to the second input and the second optical beam to the first input during a second switching state. The system further includes a controller configured to mitigate bias error in a determination of rotation of the FOG based on comparing the first and second optical beams being provided from the second and first inputs, respectively, during the first switching state and comparing the first and second optical beams being provided from the first and second inputs, respectively, during the second switching state.

DETAILED DESCRIPTION

Figure 1:
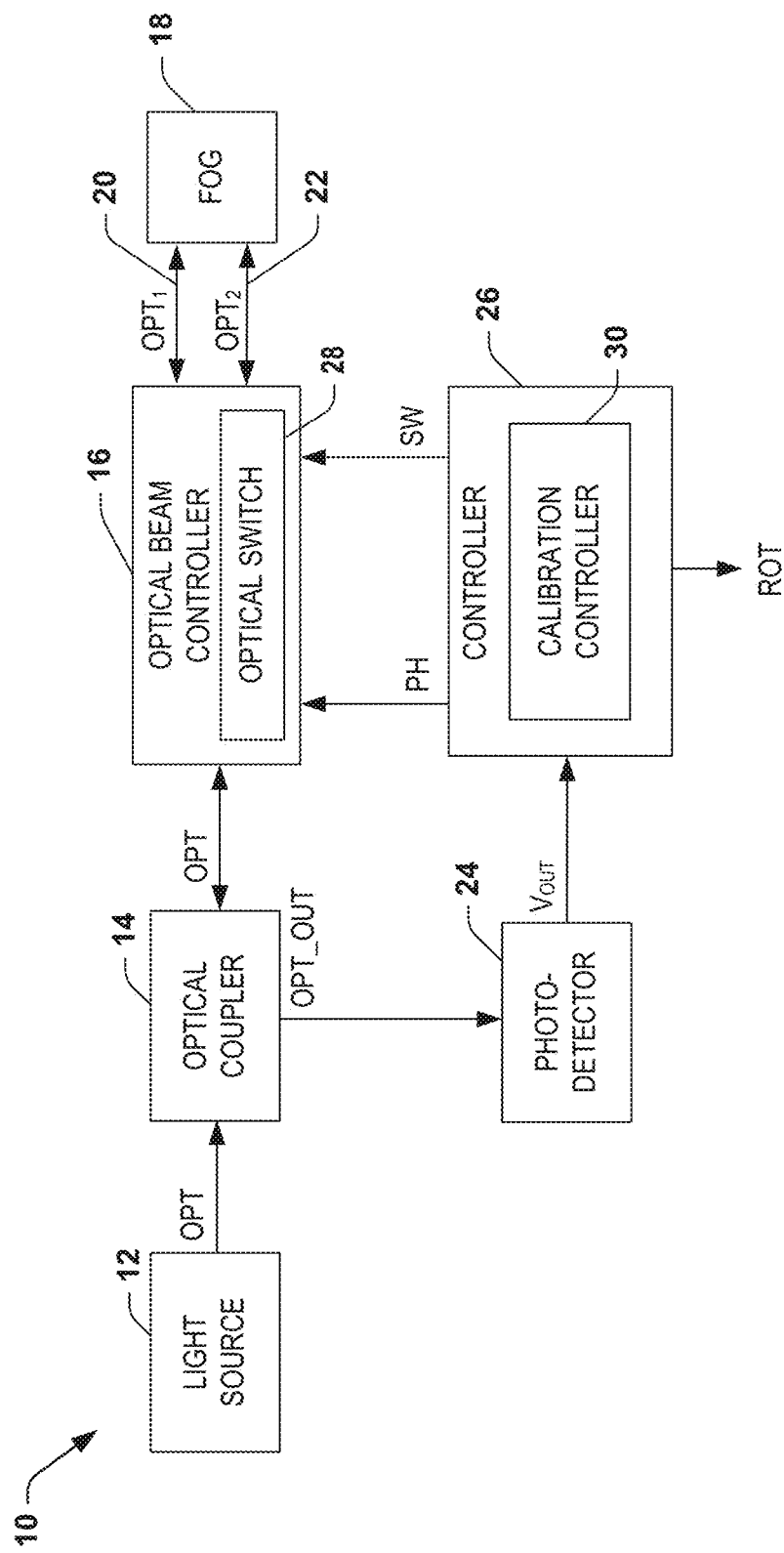
FIG. 1 illustrates an example of a FOG system.

This disclosure relates to sensors, and more particularly to a calibration circuit to mitigate fiber-optic gyroscope (FOG) bias error. A FOG can measure angular rotation using light transmitted through a fiber optic coil of the FOG and use the Sagnac effect to sense the angular rotation. The FOG system includes a light source (e.g., a broadband light source or a laser) configured to generate an optical beam. The optical beam is provided to an optical beam controller that is configured to split the optical beam into a pair of approximately equal optical beams that are injected in opposite directions into an optical fiber coil of the FOG, with the optical fiber coil including an optical fiber that is wound around a spool in a first orientation and a second orientation opposite the first orientation. Due to the Sagnac effect, the optical beam that is traveling against rotation of the FOG experiences a slightly shorter optical path than the other optical beam, thus creating a phase difference in the optical beams exiting the FOG. The resulting difference (i.e., differential phase shift) is given by the Sagnac scale factor (SSF) times the angular rate and can be used to calculate the rotation (e.g., rate) of the FOG. As an example, during operation of the FOG, modulation output signals at calculated time increments referred to as tau time periods are applied to the light beams in order to improve the sensitivity and performance (e.g., accuracy, bandwidth) of the gyroscope. Modulation output signals can be applied at a beginning of a transit time period tau, which refers to the time it takes for light to be applied to the optical fiber coil and returned from the other end of the optical fiber coil after being applied. In conventional FOGs, the modulation time is approximately equal to the optical transit time tau.

The optical beam controller of the FOG system described herein includes an optical switch that is configured to provide the pair of optical beams into the optical fiber of the optical fiber coil in a reversible manner. For example, the FOG system can periodically alternate between a first switching state and a second switching state. In the first switching state, the first optical beam of the pair of optical beams can be provided to a first input of the optical fiber coil and the second optical beam of the pair of optical beams can be provided to a second input of the optical fiber coil. In the second switching state, the first optical beam can be provided to the second input of the optical fiber coil and the second optical beam can be provided to the first input. Therefore, the scale factor relating the detection signal to the rotation rate is reversed in the second switching state relative to the first switching state. As a result, measurements of the rotation of the FOG can be compared in each of the first and second switching states to estimate a bias error associated with the FOG system. For example, the bias error can be associated with environmental variations (e.g., temperature, pressure, etc.) and process variations (e.g., tolerance mismatches, etc.) that can affect the optical path of the optical beams through the FOG. Therefore, the estimated bias error can be subtracted from the determined rotation of the FOG.

For example, a micro electro-mechanical system (MEMS) switch could alter the light path by changing the mechanical orientation of micro-scale optical elements as a function of an electrical actuation signal. As another example, the optical switch can be configured as a solid-state switch, as opposed to a MEMS switch. Such an optical switch can be fabricated on an electro-optic substrate (e.g., Lithium Niobate) configured to pass light in different paths depending on the voltage applied to it. As another example, the optical switch can be fabricated on a same substrate (e.g., Lithium Niobate) as a multifunction integrated optical chip (MIOC) that is implemented as part of the interferometer that determines the rotation of the FOG based on the phase difference of the optical beams output from the FOG. As an example, the optical switch can include an input tapered coupler that receives the pair of optical beams, a phase modulator that implements directional switching of the optical beams in each of the first and second switching states in response to a switching signal, and an output tapered coupler configured that provides the pair of optical beams to the inputs of the FOG based on the switching state. As a result, the periodic switching between the first and second switching states can be very rapid. For example, the switching time between the first and second switching states can be much faster than the transit time of light through the optical fiber coil to ensure that rotation rate data is not lost in the switching between the first and second switching states.

FIG. 1 illustrates an example of a fiber-optic gyroscope (FOG) system 10. The FOG system 10 can be used in any of a variety of applications in which precise measurement of rotation of a platform is required. For example, the FOG system 10 can be implemented in vehicular navigation, such as in aerospace or nautical vehicular applications as a part of an inertial navigation system (INS). The FOG system 10 is configured to determine a rotation, demonstrated in the example of FIG. 1 as a signal ROT, of the FOG system 10 about a sensitive axis. As described herein, the FOG system 10 can be an interferometric FOG (iFOG) that uses interferometry to determine the rotation of the FOG system 10 about the sensitive axis.

The FOG system 10 includes a light source 12 (e.g., a broadband source or a laser) configured to generate an optical beam OPT. The optical beam OPT is provided (e.g., via an optical fiber) to an optical coupler 14 that is configured to generate an output optical beam OPT_OUT that can be monitored to determine the rotation of the FOG system 10, as described in greater detail herein. The optical signal OPT is provided (e.g., via an optical fiber or an optical waveguide) from optical coupler 14 to an optical beam controller 16. The optical beam controller 16 is configured to split the optical beam OPT into a pair of optical beams that are provided to a FOG 18 and to perform optical interferometry of the pair of optical beams that propagate through and are output from the FOG 18. As an example, the optical beam controller 16 can include a multifunction integrated optical circuit (MIOC) that is configured to provide phase modulation of the optical beams. In the example of FIG. 1, the phase modulation can be implemented by one or more phase modulation signals PH.

The FOG 18 can include a single optical fiber that is wound around a spool such that the two ends of the fiber remain accessible. For example, the fiber winding can begin from the middle of the length of fiber and winding can progress alternately from each end in opposite directions such that approximately half the length of the optical fiber can be wound in a first orientation (e.g., "clockwise") and approximately half the length of the optical fiber can be wound in a second orientation (e.g., "counter-clockwise"). Therefore, the two ends of the optical fiber can form separate respective inputs and complementary outputs of the FOG 18, demonstrated in the example of FIG. 1 as a first I/O connection 20 and a second I/O connection 22. In the example of FIG. 1, the inputs to the FOG 18 from the optical beam controller 16 are demonstrated as optical beams $OPT_1$ and $OPT_2$ that correspond to the separate respective I/O connections 20 and 22 of the optical fiber, and therefore the FOG 18.

Therefore, each of the pair of optical beams can be provided to a respective input of the FOG 18 to the I/O connections 20 and 22 as the optical beams $OPT_1$ and $OPT_2$, respectively, such that the optical beams $OPT_1$ and $OPT_2$ can each propagate through the FOG 18 and can each be output at the opposite one of the I/O connections 20 and 22 without interference of the photons of the counter-propagating optical beams $OPT_1$ and $OPT_2$. The output optical beams can thus propagate back through the optical beam controller 16 to be recombined via optical interference and provided back to the optical coupler 14. As a result, the optical coupler 14 can provide the combined output optical beams as the optical output beam OPT_OUT. For example, the optical coupler 14 can correspond to a 1×2 optical coupler that directs the optical beam OPT provided from the light source 12 to the optical beam controller 16, and can provide power separation (e.g., 50% of the power) of the optical output beam returning from the optical beam controller 16 as the OPT_OUT beam. The optical output beam OPT_OUT is provided to a photodetector (e.g., a photodiode) 24 that is configured to generate a voltage signal $V_{OUT}$ corresponding to the intensity of the optical output signal OPT_OUT. The voltage signal $V_{OUT}$ is provided to a controller 26 that is configured to determine the rotation ROT of the FOG system 10 based on the voltage signal $V_{OUT}$.

For example, in response to rotation of the FOG 18, one of the optical beams $OPT_1$ and $OPT_2$ that propagates along the same direction of rotation experiences a relatively longer optical path length than the other of the optical beams $OPT_1$ and $OPT_2$ due to the Sagnac effect. The signals can be differentiated based on the phase modulation by the optical beam controller 16 in response to the phase modulation signals PH generated by the controller 26. As a result, the optical output beams provided in the combined optical output beam OPT_OUT can exhibit a phase difference. The differential phase difference can be identified by the controller 26 to calculate the rotation (e.g., rate) of the FOG system 10. However, in a typical FOG, the calculation of the rotation can include bias errors. For example, the bias errors can be associated with environmental variations (e.g., temperature, pressure, etc.) and process variations (e.g., tolerance mismatches, etc.) that can affect the optical path of the optical beams through the FOG system 10 as well as the affecting the performance of the optical beam controller 16.

To mitigate the bias errors in the determination of the rotation ROT of the FOG system 10, the optical beam controller 16 includes an optical switch 28 and the controller 26 can include a calibration controller 30. The calibration controller 30 can be configured to substantially continuously implement a calibration procedure during operation of the FOG system 10. The calibration controller 30 is configured to generate a switching signal SW that is provided to the optical switch 26, such that the optical switch 26 can periodically alternate between a first switching state and a second switching state associated with the pair of optical beams that are provided to the I/O connections 20 and 22 of the FOG 18. In the first switching state, a first optical beam of the pair of optical beams can be provided to the first I/O connection 20 and a second optical beam of the pair of optical beams can be provided to the second I/O connection 22. In the second switching state, the first optical beam can be provided to the second input of the optical fiber coil and the second optical beam can be provided to the first input.

Based on the switching of the optical beams being provided to the I/O connections 20 and 22, the scale factor (SF) relating the measurement of rotation to the angular rate is reversed in the second switching state relative to the first switching state. As a result, the calibration controller 30 can compare the measurements of the rotation ROT of the FOG system 10 in each of the first and second switching states to estimate a bias error associated with the FOG system 10. Therefore, the controller 26 can subtract the estimated bias error from the determined rotation ROT of the FOG system 10.

As an example, the optical switch 26 can be configured as a solid-state switch, as opposed to a microelectromechanical system (MEMS) switch. For example, the optical beam controller 16 can include a multifunction integrated optical chip (MIOC) that is implemented as part of the interferometer that determines the rotation of the FOG system 10 based on the phase difference of the optical beams output from the FOG 18. Therefore, the optical switch 26 can be fabricated on a same substrate (e.g., Lithium Niobate) as the MIOC of the optical beam controller 16. Because the optical switch 26 can be implemented as a solid-state switch, the optical switch 26 can implement very rapid switching (e.g., more rapid than a MEMS switch). For example, the switching signal SW can be generated to be coincident with the start of a modulation cycle of the optical fiber coil of the FOG system 10 to ensure that rotation rate data is not lost in the periodic switching between the first and second switching states. Alternatively, the optical switch 26 can be arranged as a MEMS switch instead of a solid-state switch.

Figure 2:
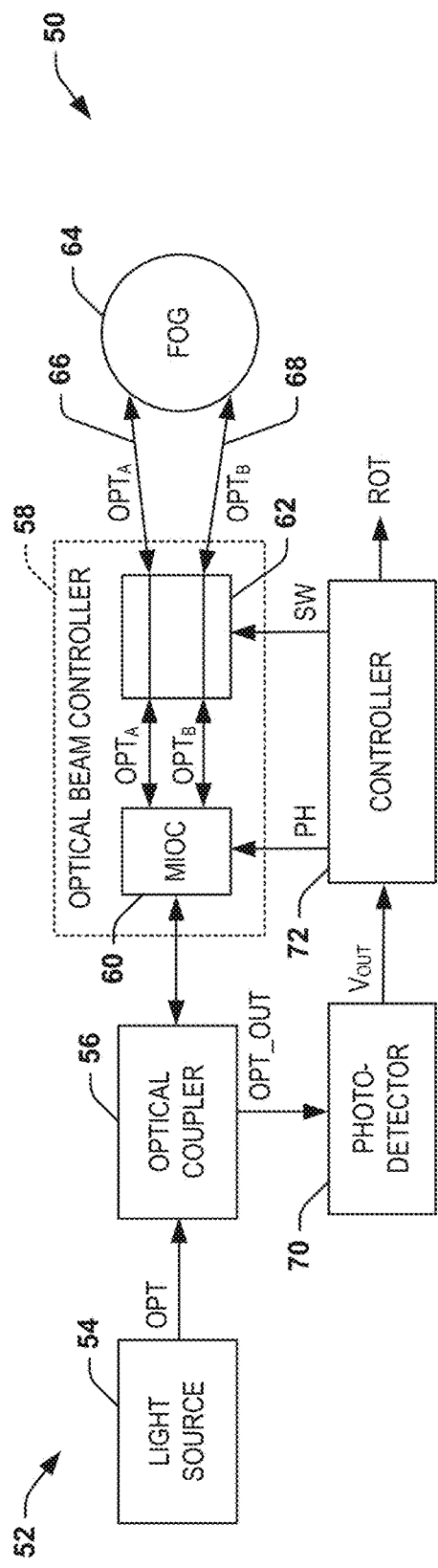
FIG. 2 illustrates an example diagram of a FOG system in a first switching state.
Figure 3:
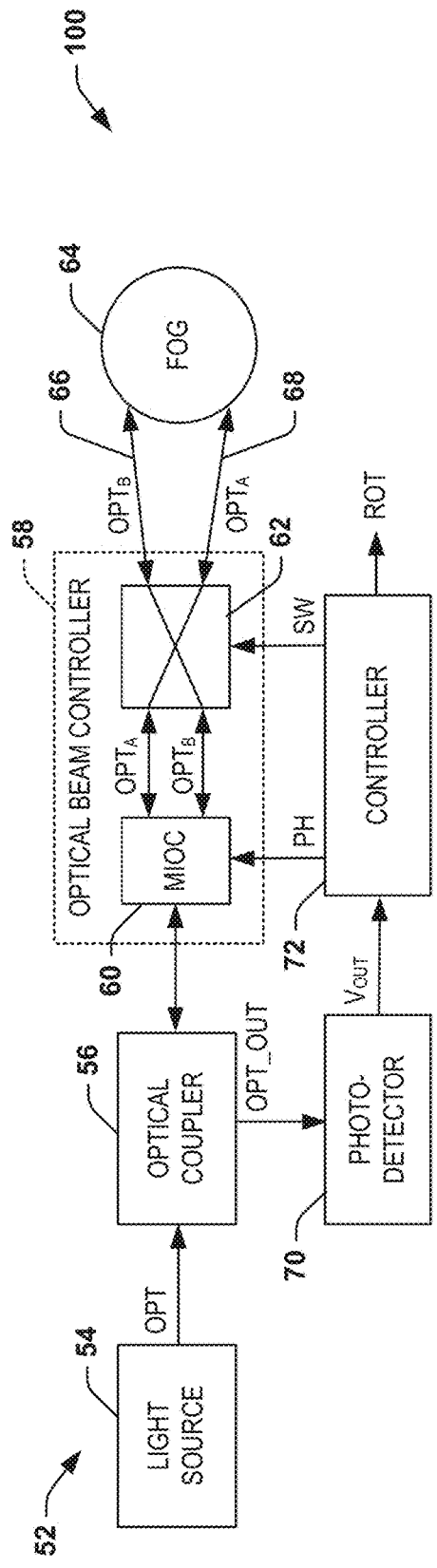
FIG. 3 illustrates another example diagram of a FOG system in a second switching state.

FIG. 2 illustrates an example diagram 50 of a FOG system 52 in a first switching state, and FIG. 3 illustrates an example diagram 100 of the FOG system 52 in a second switching state. The FOG system 52 can correspond to the FOG system 10 in the example of FIG. 1. Therefore, reference is to be made to the example of FIG. 1 in the following description of the examples of FIGS. 2 and 3.

The FOG system 52 is configured substantially similar to the FOG system 10 in the example of FIG. 1. Therefore, the FOG system 52 includes a light source 54 (e.g. a broadband source or a laser) configured to generate an optical beam OPT that is provided to an optical coupler 56 that is configured to generate an output optical beam OPT_OUT that can be monitored to determine the rotation of the FOG system 52. The optical signal OPT is provided (e.g., via an optical fiber or an optical waveguide) from the optical coupler 56 to an optical beam controller 58. For example, the optical beam controller 58 can include an optical waveguide, such that the optical fiber OPT propagates via an optical fiber that is coupled to the waveguide associated with the optical beam controller 58 via a direct pigtail connection or fiber splice.

In the example of FIGS. 2 and 3, the optical beam controller 58 includes a MIOC 60 and an optical switch 62. The MIOC 60 is configured to split the optical beam OPT into a first optical beam $OPT_A$ and a second optical beam $OPT_B$. For example, the MIOC 60 is also configured to provide phase modulation of the optical beams $OPT_A$ and $OPT_B$ in response to one or more phase modulation signals PH. The optical switch 62 is demonstrated in the example of FIGS. 2 and 3 as a 2×2 switch that is responsive to a switching signal SW to be set to the first switching state (e.g., as demonstrated in the diagram 50 of the example of FIG. 2) or to a second switching state (e.g., as demonstrated in the diagram 100 of the example of FIG. 3). The first and second switching states determine the direction of propagation of the optical beams $OPT_A$ and $OPT_B$ through the FOG 64.

The optical switch 62 is coupled to a FOG 64 via a first I/O connection 66 and a second I/O connection 68 (e.g., via direct fiber pigtail connections or fiber splices). In the first switching state demonstrated in the diagram 50, the first optical beam $OPT_A$ is provided to the first I/O connection 66, propagates through the FOG 64, and is output from the FOG 64 via the second I/O connection 68. Similarly, in the first switching state demonstrated in the diagram 50, the second optical beam $OPT_B$ is provided to the second I/O connection 68, propagates through the FOG 64, and is output from the FOG 64 via the first I/O connection 66. However, in the second switching state demonstrated in the diagram 100, the first optical beam $OPT_A$ is provided to the second I/O connection 68, propagates through the FOG 64, and is output from the FOG 64 via the first I/O connection 66. Similarly, in the second switching state demonstrated in the diagram 100, the second optical beam $OPT_B$ is provided to the first I/O connection 66, propagates through the FOG 64, and is output from the FOG 64 via the second I/O connection 68.

Similar to as described in the example of FIG. 1, in each of the diagrams 50 and 100, the optical beams $OPT_A$ and $OPT_B$ output from the FOG 64 are combined in the MIOC 60 and are provided from the optical coupler 56 as the optical output beam OPT_OUT. For example, the optical coupler 56 can correspond to a 1×2 optical coupler that directs the optical beam provided from the light source 12 to the optical beam controller 16, and can provide power separation (e.g., 50% of the power) of the optical output beam returning from the optical beam controller 16 as the OPT_OUT beam. The optical output beam OPT_OUT is provided to a photodetector (e.g., a photodiode) 70 that is configured to generate a voltage signal $V_{OUT}$ corresponding to the intensity of the optical output signal OPT_OUT. The voltage signal $V_{OUT}$ is provided to a controller 72 that is configured to determine the rotation ROT of the FOG system 52 based on the voltage signal $V_{OUT}$.

Based on the reversal of the propagation direction of the optical beams $OPT_A$ and $OPT_B$ in each of the respective switching states of the diagrams 50 and 100, the SF of the FOG 64 can be reversed in the first and second switching states relative to each other. In other words, the polarity of the SF is reversed based on the reversal of the optical paths of each of the optical beams $OPT_A$ and $OPT_B$. As a result, the controller 72 (e.g., via the calibration controller 30; not shown in the examples of FIGS. 2 and 3) can estimate bias errors based on comparing the determined rotation ROT in each of the first and second switching states. As a result, the controller 72 can substantially mitigate the bias errors by subtracting the estimated bias errors from the determined rotation ROT in a feedback manner.

For example, the non-compensated rotations ROT of the FOG system 52 can be calculated as follows:

$$ROT_1 = SSF*\Omega + B_{ERR} \quad \text{Equation 1}$$

$$ROT_2 = -SSF*\Omega + B_{ERR} \quad \text{Equation 2}$$

Where: $ROT_1$ corresponds to the non-compensated rotation ROT in the first switching state;
$ROT_2$ corresponds to the non-compensated rotation ROT in the second switching state;
$\Omega$ corresponds to a true rotation of the FOG system 52; and
$B_{ERR}$ corresponds to the bias error.

Therefore, bias error can be substantially canceled by subtracting the determined rotations, as follows:

$$ROT_1 - ROT_2 = (SSF*\Omega + B_{ERR}) - (-SSF*\Omega + B_{ERR}) \quad \text{Equation 3}$$

$$ROT_1 - ROT_2 = 2*(SSF*\Omega) \quad \text{Equation 4}$$

Therefore, the controller 72 can estimate the bias error by adding the determined rotations, as follows:

$$ROT_1 + ROT_2 = 2*B_{ERR} \quad \text{Equation 5}$$

As a result, the controller 72 can merely subtract the bias error from the determined rotation ROT (e.g., $ROT_1$ or $ROT_2$) in a feedback manner to substantially mitigate the bias error from the determined rotation ROT. As an example, in the case where $\Omega$ may be varying, more sophisticated estimators of bias can be used. For example, a Kalman filter could be used to observe the bias errors over a long period of time and continuously refine the bias error estimates. In addition, with rapid switching capability, it is possible to obtain the determined rotation $ROT_1$ and/or the determined rotation $ROT_2$ closely spaced in time, therefore desensitizing the bias estimation to changing $\Omega$ conditions.

Figure 4:
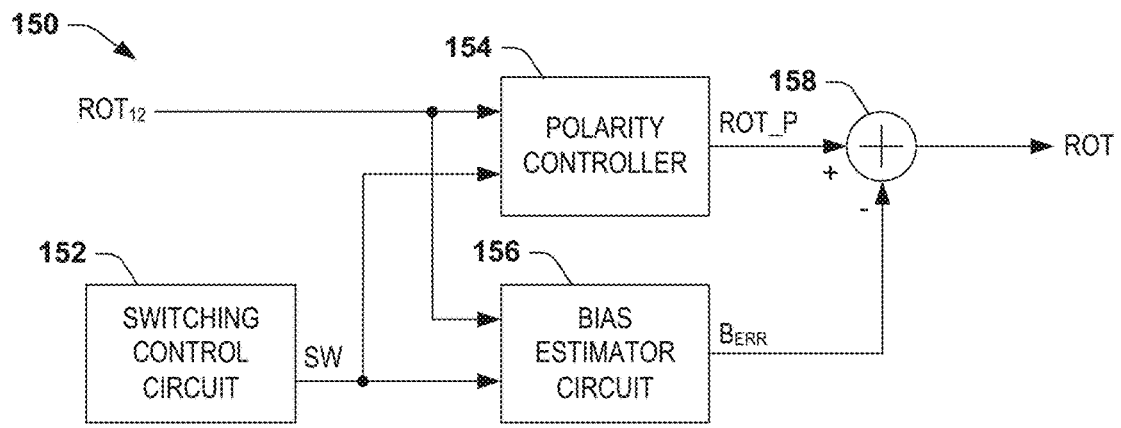
FIG. 4 illustrates an example diagram of a calibration controller.

FIG. 4 illustrates an example diagram of a calibration controller 150. The calibration controller 150 can correspond to the calibration controller 30 in the example of FIG. 1, and thus can be implemented in the controller 72 in the examples of FIGS. 2 and 3. Therefore, reference is to be made to the examples of FIGS. 1-3 in the following description of the example of FIG. 4.

The calibration controller 150 includes a switching control circuit 152, a polarity controller 154, and a bias estimator circuit 156. The switching control circuit 152 is configured to generate the switching signal SW, such as based on a local oscillator signal having a predetermined frequency, or under the control of a micro-processor. As an example, the predetermined frequency of the switching signal SW, and thus the switching frequency between the first and second switching states, can be very rapid. For example, the frequency of the switching signal SW can be at the resonant frequency of the optical fiber coil of the FOG 18 or FOG 64 and for example coincident with the start of a modulation cycle to ensure that rotation rate data is not lost in the periodic switching between the first and second switching states, as described in greater detail herein. Switching can also occur at a lower frequency to allow averaging in each switch state over multiple modulation cycles.

The switching signal SW is provided to the polarity controller 154 and the bias estimator circuit 156, as well as the optical switch (e.g., the optical switch 28 or the optical switch 62; not shown in the example of FIG. 4). The polarity controller 154 and the bias estimator circuit 156 each also receive the non-compensated rotation $ROT_{12}$ (corresponding to the non-compensated rotations $ROT_1$ or $ROT_2$), as determined by the controller 72, that includes the bias error. The bias estimator circuit 156 can thus identify the switching state of the optical switch 62, such that the bias estimator circuit 156 can add the non-compensated rotation $ROT_{12}$ in each of consecutive switching states (e.g., the non-compensated rotations $ROT_1$ and $ROT_2$), such as provided by Equation 5. Therefore, by dividing the result of the addition of the non-compensated rotation $ROT_{12}$ in each of the consecutive states by two, the bias estimator circuit 156 can determine the estimated bias error $B_{ERR}$. The bias estimator 156 could also include adaptive estimation approaches such as Kalman filtering to process the compensated rotation $ROT_{12}$ more optimally in dynamic conditions.

The polarity controller 154 can likewise identify the switching state of the optical switch 62 based on the switching signal SW, and can assign a polarity to the non-compensated rotation $ROT_{12}$ based on the respective switching state corresponding to the respective reversed polarity of the SF for each of the respective switching states. Therefore, the polarity controller 154 can provide the sign-corrected non-compensated rotation ROT_P as an output. In the example of FIG. 4, the calibration controller 150 further includes a summer 158 that is configured to subtract the estimated bias error $B_{ERR}$ from the sign-corrected non-compensated rotation ROT_P. As a result, the summer 158 can output the determined rotation ROT as a compensated rotation of the FOG 64, such that the determined rotation ROT is approximately equal to the true rotation $\Omega$ of the FOG system 52.

Figure 5:
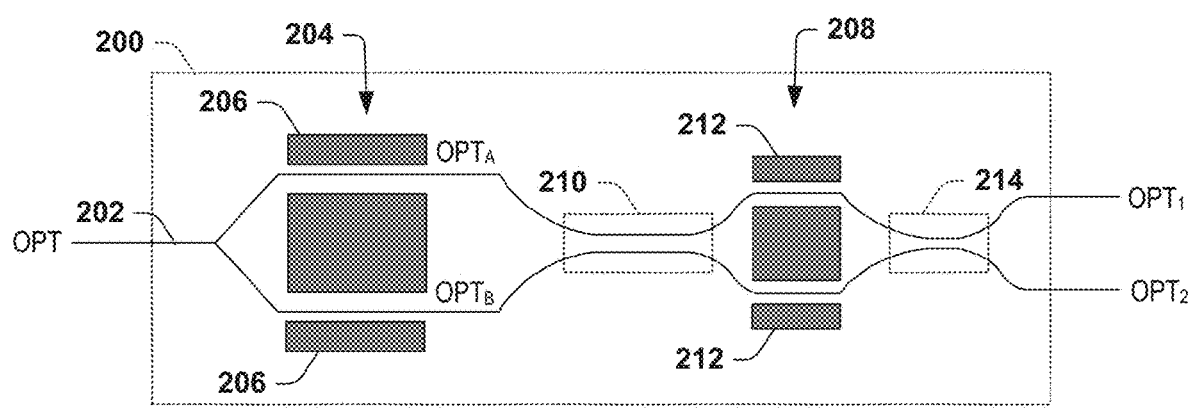
FIG. 5 illustrates an example diagram of an optical beam controller.

FIG. 5 illustrates an example diagram of an optical beam controller 200. The optical beam controller 200 can correspond to the optical beam controller 16 and 58 in the examples of FIGS. 1-3. Therefore, reference is to be made to the examples of FIGS. 1-3 in the following description of the example of FIG. 5.

The optical beam controller 200 includes a waveguide 202 that is configured to receive the optical beam OPT (e.g., and to propagate the combined optical output beam OPT_OUT before it is separated by the optical coupler 56). For example, the waveguide 202 can be coupled to an optical fiber via a direct pigtail or splice. In the example of FIG. 5, the waveguide 202 splits the optical beam OPT (e.g., and recombines the combined optical output beam) into the first optical beam $OPT_A$ and the second optical beam $OPT_B$. The optical beam controller 200 also includes a MIOC 204. The MIOC 204 includes a set of electrodes 206 that can be controlled via the phase modulation signal(s) PH to implement phase modulation on the optical beams $OPT_A$ and $OPT_B$ to perform the interferometry with respect to the first and second optical beams $OPT_A$ and $OPT_B$ for determining the rotation ROT, as described herein.

The optical beam controller 200 also includes an optical switch 208. In the example of FIG. 5, the optical switch 208 includes a first tapered coupler 210, a set of electrodes 212, and a second tapered coupler 214. The first tapered coupler 210 is configured to propagate the optical beams $OPT_A$ and $OPT_B$ between the MIOC 204 and the electrodes 212, and can be configured to provide an approximately 50/50 power split of the optical beams $OPT_A$ and $OPT_B$. Similarly, the second tapered coupler 214 is configured to propagate the optical beams $OPT_A$ and $OPT_B$ between the electrodes 212 and output fibers corresponding to the optical beams $OPT_1$ and $OPT_2$ in the example of FIG. 1, and can be configured to provide an approximately 50/50 power split of the optical beams $OPT_A$ and $OPT_B$. The electrodes 212 can be arranged substantially similarly to the electrodes 206 of the MIOC 204. For example, the MIOC 204 and the optical switch 208 can be disposed on the same substrate (e.g., a Lithium Niobate substrate). Alternatively, the MIOC 204 and the optical switch 208 can be arranged on separate devices (e.g., separate chips).

Therefore, the optical switch 208 can be arranged substantially similarly, for example, to a Mach-Zehnder interferometer with counter-tapered directional couplers. For example, in response to the switching signal SW at a first state (e.g., an approximately zero voltage), the optical beam $OPT_A$ is provided through the optical switch 208 as the optical beam $OPT_1$ and the optical beam $OPT_B$ is provided through the optical switch 208 as the optical beam $OPT_2$, such as in the first switching state corresponding to the diagram 50 in the example of FIG. 2. However, in response to the switching signal SW at a second state (e.g., a positive voltage), the electrodes provide a refractive index change that provides a differential phase shift (e.g., a $\pi$ differential phase shift) couples the optical energy between the separate waveguides in the first and second tapered couplers 210 and 214. Therefore, the propagating optical beams $OPT_A$ and $OPT_B$ switch waveguides, such that the optical beam $OPT_A$ is provided through the optical switch 208 as the optical beam $OPT_2$ and the optical beam $OPT_B$ is provided through the optical switch 208 as the optical beam $OPT_1$, such as in the second switching state corresponding to the diagram 100 in the example of FIG. 3.

The optical switch 208 being arranged as a solid-state optical switch, as opposed to a MEMS or a prism optical switch, can provide for very rapid switching between the first and second switching states. As an example, the predetermined frequency of the switching signal SW, and thus the switching frequency between the first and second switching states, can be very rapid. For example, the frequency of the switching signal SW can be at the resonant frequency of the optical fiber coil of the FOG 18 or FOG 64 to ensure that rotation rate data is not lost in the periodic switching between the first and second switching states. For example, the FOG 18 or FOG 64 can have a coil resonant frequency in the range of between approximately 30 kHz and approximately 500 kHz. To avoid dropping angular rate data, the switching frequency between the first and second switching states can have a settling time of less than about a microsecond. As an example, based on the optical switch (e.g., the optical switch 28 or the optical switch 208) being configured as a solid-state switch, the switching frequency can be fast enough to achieve a switching settling time of close to approximately one nanosecond.

Figure 6:
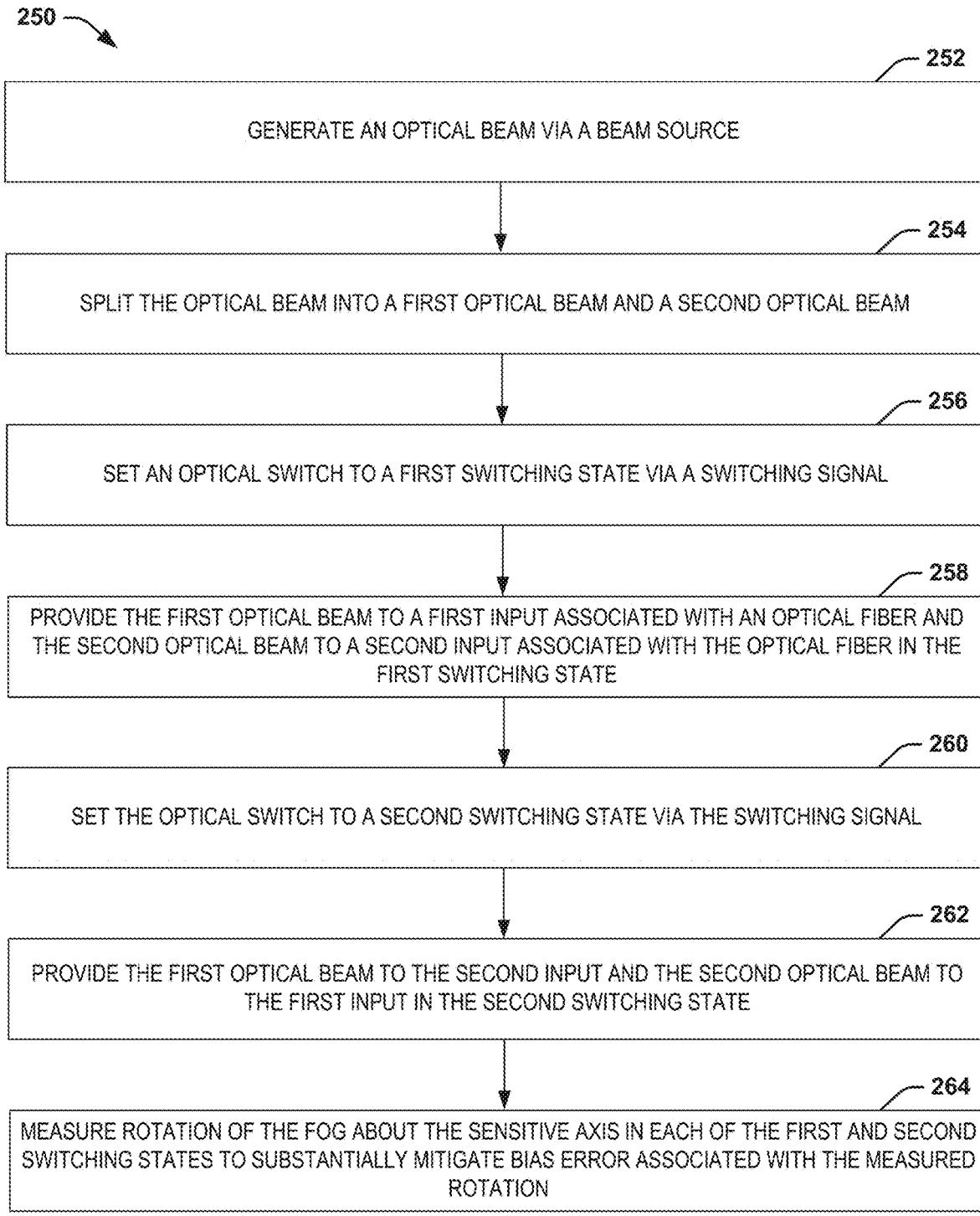
FIG. 6 illustrates an example of a method for determining rotation about a sensitive axis for a fiber-optic gyroscope (FOG) system.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 6 illustrates an example of a method 250 for determining rotation about a sensitive axis for a FOG system (e.g., the FOG system 10). At 252, an optical beam (e.g., the optical beam OPT) is generated via a beam source (e.g., the beam source 12). At 254, the optical beam is split into a first optical beam (e.g., the optical beam $OPT_A$) and a second optical beam (e.g., the optical beam $OPT_B$). At 256, an optical switch (e.g., the optical switch 28) is set to a first switching state via a switching signal (e.g., the switching signal SW). At 258, the first optical beam is provided to a first input (e.g., the I/O connection 20) associated with an optical fiber (e.g., of the FOG 18) and the second optical beam to a second input (e.g., the I/O connection 22) associated with the optical fiber in the first switching state. The optical fiber can form an optical fiber coil wound around a spool of a FOG (e.g., the FOG 18) in a first orientation and a second orientation opposite the first orientation, respectively. At 260, the optical switch is set to a second switching state via the switching signal. At 262, the first optical beam is provided to the second input and the second optical beam to the first input in the second switching state. At 264, rotation of the FOG is measured about the sensitive axis in each of the first and second switching states (e.g., via the controller 26) to substantially mitigate bias error associated with the measured rotation.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A fiber-optic gyroscope (FOG) system comprising:
   an optical fiber coil comprising an optical fiber wound around a spool of a FOG in a first orientation and a second orientation opposite the first orientation, the optical fiber comprising a first input and a second input;
   an optical beam controller comprising an optical switch configured to provide a first optical beam to the first input and a second optical beam to the second input during a first switching state and to provide the first optical beam to the second input and the second optical beam to the first input during a second switching state; and a controller configured to mitigate bias error in a determination of rotation of the FOG based on comparing the first and second optical beams being provided from the second and first inputs, respectively, during the first switching state and comparing the first and second optical beams being provided from the first and second inputs, respectively, during the second switching state.

2. The system of claim 1, wherein the controller comprises a calibration controller that is configured to estimate the bias error based on measuring the rotation of the FOG with a first scale factor (SF) in the first switching state and a second SF in the second switching state, where the first and second SFs are equal and opposite each other, and wherein the calibration controller is configured to subtract the estimated bias error from the measured rotation of the FOG in a feedback manner.

3. The system of claim 1, wherein the optical beam controller further comprises a multifunction integrated optical chip (MIOC) configured to provide phase control of the first and second optical beams.

4. The system of claim 3, wherein the optical switch is configured as a 2×2 solid-state optical switch.

5. The system of claim 4, wherein each of the MIOC and the optical switch are formed on a common substrate.

6. The system of claim 3, wherein the optical switch is configured as a 2×2 micro electro-mechanical system (MEMS) optical switch.

7. The system of claim 1, wherein the optical switch comprises:
a first tapered coupler configured to receive the first optical beam at a first coupler input and the second optical beam at a second coupler input;
a phase modulator to implement directional switching of the first and second optical beams in each of the first and second switching states; and
a second tapered coupler configured to provide the first optical beam from a first coupler output and the second optical beam from a second coupler output during the first switching state and to provide the first optical beam from the second coupler output and the second optical beam from the first coupler output during the second switching state.

8. The system of claim 1, wherein the controller is further configured to provide a switching signal to the optical switch to periodically change the optical switch between the first switching state and the second switching state.

9. The system of claim 8, wherein the switching signal has a frequency that is less than or equal to a resonant frequency of the optical fiber coil.

10. The system of claim 1, further comprising a light source configured to generate an input optical beam, wherein the optical beam controller is configured to split the input optical beam into the first and second optical beams, where the estimated bias is calculated by one of comparing the measurements from the first switching state and the second switching state and by an adaptive filter combining multiple measurements from the first switching state and the second switching state.

11. The system of claim 1, further comprising:
a 1×2 optical coupler interconnecting a light source configured to generate the input optical beam and the optical beam controller, the 1×2 optical coupler receiving from the optical beam controller a combined output beam comprising the first and second optical beams output from the FOG, the 1×2 optical coupler being configured to split the combined output beam from the input optical beam; and
a photodetector configured to monitor the combined output beam, wherein the controller is configured to determine the rotation of the FOG about a sensitive axis based on the monitored combined output beam.

12. A method for determining rotation about a sensitive axis for a fiber-optic gyroscope (FOG) system, the method comprising:
generating an input optical beam via a beam source;
splitting the input optical beam into a first optical beam and a second optical beam;
setting an optical switch to a first switching state via a switching signal;
providing the first optical beam to a first input associated with an optical fiber and the second optical beam to a second input associated with the optical fiber in the first switching state, the optical fiber forming an optical fiber coil wound around a spool of a FOG;
setting the optical switch to a second switching state via the switching signal;
providing the first optical beam to the second input and the second optical beam to the first input in the second switching state;
measuring rotation of the FOG about the sensitive axis in each of the first and second switching states to substantially mitigate bias error associated with the measured rotation.

13. The method of claim 12, wherein measuring the rotation comprises:
measuring the rotation of the FOG about the sensitive axis in the first switching state with a first scale factor (SF)
measuring the rotation of the FOG about the sensitive axis in the second switching state with a second SF, wherein the first and second SFs are equal and opposite each other;
estimating the bias error based on the measured rotation of the FOG in the first and second switching states; and
subtracting the estimated bias error from the measured rotation in a feedback manner.

14. The method of claim 12, wherein setting the optical switch comprises setting the optical switch configured as a 2×2 solid-state optical switch that is formed on a common substrate with a multifunction integrated optical chip (MIOC) configured to provide phase control of the first and second optical beams.

15. The method of claim 12, wherein setting the optical switch comprises:
receiving the first optical beam at a first coupler input of a first tapered coupler and receiving the second optical beam at a second coupler input of the first tapered coupler;
phase modulating the first and second optical beams in each of the first and second switching states to implement directional switching in each of the first and second switching states; and
providing the first optical beam from a first coupler output of a second tapered coupler and providing the second optical beam from a second coupler output of the second tapered coupler during the first switching state; and
providing the first optical beam from the second coupler output of the second tapered coupler and providing the second optical beam from the first coupler output of the second tapered coupler during the second switching state.

16. A fiber-optic gyroscope (FOG) system comprising:
an optical fiber coil comprising an optical fiber wound around a spool of a FOG, the optical fiber comprising a first input and a second input;
an optical beam controller comprising:
 a multifunction integrated optical chip (MIOC) configured to split an input optical beam into a first optical beam and a second optical beam and to provide phase control of the first and second optical beams; and
 a 2×2 optical switch configured to provide the first optical beam to the first input and the second optical beam to the second input during a first switching state and to provide the first optical beam to the second input and the second optical beam to the first input during a second switching state; and
a controller configured to mitigate bias error in a determination of rotation of the FOG based on comparing the first and second optical beams being provided from the second and first inputs, respectively, during the first switching state and comparing the first and second optical beams being provided from the first and second inputs, respectively, during the second switching state.

17. The system of claim 16, wherein the controller comprises a calibration controller that is configured to estimate the bias error based on measuring the rotation of the FOG with a first scale factor (SF) in the first switching state and a second SF in the second switching state, where the first and second SFs are equal and opposite each other, and wherein the calibration controller is configured to subtract the estimated bias error from the measured rotation of the FOG in a feedback manner.

18. The system of claim 16, wherein the 2×2 optical switch is configured as a 2×2 solid-state optical switch comprising:

a first tapered coupler configured to receive the first optical beam at a first input and the second optical beam at a second input;
 a phase modulator to implement directional switching of the first and second optical beams in each of the first and second switching states; and
 a second tapered coupler configured to provide the first optical beam from a first output and the second optical beam from a second output during the first switching state and to provide the first optical beam from the second output and the second optical beam from the first output during the second switching state.

19. The system of claim 16, wherein the controller is further configured to provide a switching signal to the optical switch to periodically change the optical switch between the first switching state and the second switching state, wherein the switching signal has a frequency that is less than or equal to a resonant optical frequency of the optical fiber coil.

20. The system of claim 16, further comprising:
 a light source configured to generate an input optical beam, wherein the optical beam controller is configured to split the input optical beam into the first and second optical beams;
 a 1×2 optical coupler interconnecting the light source and the optical beam controller, the 1×2 optical coupler receiving from the optical beam controller a combined output beam comprising the first and second optical beams output from the FOG, the 1×2 optical coupler being configured to split the combined output beam from the input optical beam; and
 a photodetector configured to monitor the combined output beam, wherein the controller is configured to determine the rotation of the FOG about a sensitive axis based on the monitored combined output beam.

* * * * *